United States Patent
Schwaiger (10) Patent No.: US 10,344,934 B2
(45) Date of Patent: Jul. 9, 2019

(54) ILLUMINATION SYSTEM AND HEADLAMP

(71) Applicant: OSRAM GmbH, Munich (DE)

(72) Inventor: Stephan Schwaiger, Herbrechtingen (DE)

(73) Assignee: OSRAM GMBH, Munich (DE)

( * ) Notice: Subject to any disclaimer, the term of this patent is extended or adjusted under 35 U.S.C. 154(b) by 0 days.

(21) Appl. No.: 15/951,226

(22) Filed: Apr. 12, 2018

(65) Prior Publication Data

US 2018/0306959 A1 Oct. 25, 2018

(30) Foreign Application Priority Data

Apr. 24, 2017 (DE) .................. 10 2017 206 817

(51) Int. Cl.
| | |
|---|---|
| *F21S 41/00* | (2018.01) |
| *F21S 41/24* | (2018.01) |
| *B60Q 1/04* | (2006.01) |
| *B60Q 1/00* | (2006.01) |
| *F21S 41/141* | (2018.01) |
| *F21V 8/00* | (2006.01) |
| *F21S 41/143* | (2018.01) |
| *F21S 41/25* | (2018.01) |
| *F21S 41/663* | (2018.01) |
| *F21Y 107/50* | (2016.01) |
| *F21W 102/145* | (2018.01) |

(52) U.S. Cl.
CPC ............ *F21S 41/24* (2018.01); *B60Q 1/0011* (2013.01); *B60Q 1/0088* (2013.01); *B60Q 1/04* (2013.01); *F21S 41/141* (2018.01); *F21S 41/143* (2018.01); *F21S 41/25* (2018.01); *F21S 41/663* (2018.01); *G02B 6/0001* (2013.01); *G02B 6/0078* (2013.01); *F21W 2102/145* (2018.01); *F21Y 2107/50* (2016.08)

(58) Field of Classification Search
CPC .......... F21S 41/24; F21S 41/143; F21S 41/25; F21S 41/663; G02B 6/0075–0078; B60Q 1/02; B60Q 1/04; B60Q 1/0011
See application file for complete search history.

(56) References Cited

U.S. PATENT DOCUMENTS

| | | | |
|---|---|---|---|
| 2008/0198574 A1* | 8/2008 | Woodward | F21S 41/143 362/85 |
| 2014/0198513 A1 | 7/2014 | Stefanov et al. | |

(Continued)

FOREIGN PATENT DOCUMENTS

| | | |
|---|---|---|
| DE | 102013200442 B3 | 2/2014 |
| DE | 202015008369 U1 | 3/2017 |
| DE | 202015008369 U1 * | 3/2017 |

*Primary Examiner* — Gerald J Sufleta, II
(74) *Attorney, Agent, or Firm* — Viering Jentschura & Partner MBB (57) ABSTRACT

In various embodiments, an illumination system is provided. The illumination system may include at least two light guides, which each have an input coupling surface and an output coupling surface, and at least one radiation source having a radiation surface that faces the corresponding input coupling surface provided for a respective light guide. A distance between the input coupling surface of one of the light guides and the radiation surface of the at least one assigned radiation source and the distance between the input coupling surface of a further light guide and the radiation source of the at least one assigned radiation source differ.

14 Claims, 3 Drawing Sheets

(56) References Cited

U.S. PATENT DOCUMENTS

| | | | |
|---|---|---|---|
| 2015/0085523 A1* | 3/2015 | Gurtl | F21S 41/143 362/607 |
| 2015/0124469 A1* | 5/2015 | Krenn | G02B 6/0068 362/511 |
| 2017/0089536 A1* | 3/2017 | Courcier | F21S 41/143 |
| 2018/0245759 A1* | 8/2018 | Plank | F21S 41/143 |
| 2018/0328562 A1* | 11/2018 | Taudt | F21S 41/143 |

* cited by examiner

Imax=90kcd

Imax=100kcd

ILLUMINATION SYSTEM AND HEADLAMP

CROSS-REFERENCE TO RELATED APPLICATION

This application claims priority to German Patent Application Serial No. 10 2017 206 817.5, which was filed Apr. 24, 2017, and is incorporated herein by reference in its entirety.

TECHNICAL FIELD

Various embodiments relate generally to an illumination system. Various embodiments furthermore relate generally to a headlamp having an illumination system.

BACKGROUND

Conventional vehicles have an adaptive driving beam (ADB) as an additional feature. Light-emitting diodes (LEDs) that are arranged in a matrix can be used herefor, for example, wherein the LEDs are part of a module. Each individual or groups of LED(s) in the module are then able to be separately controlled and consequently switched on and off and also dimmed. In combination with a camera system and image-processing electronics, oncoming traffic and vehicles driving in front, for example, are detected and are at least partly masked out. It is hereby feasible, for example, to drive permanently with "high beam" without dazzling other road users, e.g. if specific conditions are present. The conditions present can be that the vehicle is driving outside a town or village and/or has a speed of more than 50 km/h. In addition to other road users, it is also possible for strongly reflective areas, such as for example signs, to be locally masked out or to be irradiated with a reduced light output.

It is generally required in vehicles for their headlamps to have the highest possible efficiency. It may further be desired for vehicle manufacturers if light sources and/or modules, such as the ADB system, are designed as a module that is as small, lightweight, bright, cost-effective and simple in terms of apparatus as possible, as a result of which the vehicle manufacturer has a high flexibility in terms of the design of the vehicle and can save costs, weight etc.

SUMMARY

In various embodiments, an illumination system is provided. The illumination system may include at least two light guides, which each have an input coupling surface and an output coupling surface, and at least one radiation source having a radiation surface that faces the corresponding input coupling surface provided for a respective light guide. A distance between the input coupling surface of one of the light guides and the radiation surface of the at least one assigned radiation source and the distance between the input coupling surface of a further light guide and the radiation source of the at least one assigned radiation source differ.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various embodiments provide an illumination system and a headlamp that are embodied to be simple in terms of apparatus and cost-effective, while having a high efficiency.

Provided according to various embodiments is an illumination system, e.g. for a vehicle, having at least two light guides. Said light guides may each have an input coupling surface and an output coupling surface. Furthermore, at least one radiation source can be provided for a respective light guide. It is also feasible, by way of example, for a radiation source to be used for a plurality of light guides. The radiation source or a respective radiation source may have a radiation surface that can in each case face the input coupling surface of the corresponding light guide. In various embodiments, a distance between the input coupling surface of one of the light guides and the radiation surface of a radiation source that is assigned thereto and a distance between the input coupling surface of a further light guide or of the other light guide, if exactly two light guides are present, and the radiation surface of a radiation source that is assigned thereto differ.

This solution may have the effect that radiation emitted by the radiation sources can be coupled into the corresponding light guide with a different efficiency due to the different distance. The smaller the distance is, the greater is the efficiency of the input coupling of the corresponding radiation. It is thus possible to set a light intensity and light distribution of the radiation that is coupled out of the light guides on the basis of the different distances. Due to the different distances or due to the setting of the distances, additional parameters are thus provided, by way of which a light distribution can be influenced. This may be provided for example in vehicles, e.g. if the illumination system is used for a high beam, to then set the light distribution herein as per requirements by way of different distances in a manner which is simple in terms of apparatus. Consequently, a light distribution can be adapted easily based on the relevant wishes and requirements, because the setting of the distances makes possible the setting of the efficiency of the coupling of the radiation into the light guides.

In a further configuration of various embodiments, the input coupling surfaces or the output coupling surfaces of the light guides can face in an identical direction and/or have an identical orientation. This makes it possible for radiation to be coupled into the light guides from one side, as a result of which a simple setup is provided. If necessary, it is of course also feasible for different directions or different orientations of the at least two input coupling surfaces or some of the input coupling surfaces, if a multiplicity of input coupling surfaces is provided, or all input coupling surfaces to be arranged such that they face in different directions. This can then also correspondingly apply to the output coupling surfaces.

The radiation surfaces of the radiation sources preferably face in an identical direction or have an identical orientation, which results in an arrangement that is simple in terms of apparatus. If required, it is alternatively feasible for the at least two radiation surfaces or some of the radiation surfaces, if a multiplicity of radiation surfaces are provided, or all radiation surfaces to face in different directions or be differently oriented.

The surface normals of the input coupling surfaces and/or optical main axes of the input coupling surfaces may be arranged such that they are, e.g. approximately, parallel to one another. It is feasible for the surface normals of the radiation surfaces and/or the main emission axes of the radiation surfaces to be arranged such that they are, e.g. approximately, parallel to one another. Provision may furthermore be made for the surface normals and/or the main emission axes of the radiation surfaces and the surface normals and/or optical main axes of the input coupling surfaces to be arranged such that they are, e.g. approximately, parallel to one another, which in each case or overall results in a configuration which is simple in terms of apparatus.

In various embodiments, a reference plane is provided, wherein the at least two input coupling surfaces have a different distance from the reference plane. The reference plane extends for example, e.g. approximately, transversely to the surface normal and/or to the optical main axes of the input coupling surfaces. In a further configuration of various embodiments, it is feasible for the radiation surfaces to have an, e.g. approximately, identical distance from the reference plane. As a result, the distance can be set via the arrangement of the input coupling surfaces, because the radiation surfaces can be situated for example in a common plane due to the identical distance from the reference plane. In other words, it is feasible for an input coupling surface or individual input coupling surfaces or groups of input coupling surfaces to have a different distance from the reference plane. The input coupling surfaces are e.g. provided on a same side of the reference plane.

In a further configuration of various embodiments, provision may be made for the at least two radiation surfaces to have a different distance from the reference plane. Provision can here be made for example for the input coupling surfaces to have an, e.g. approximately, identical distance from the reference plane. As a result, the different distances between the input coupling surfaces and the corresponding radiation surfaces can be provided by way of a different arrangement of the radiation surfaces. In other words, a radiation surface or individual radiation surfaces or groups of radiation surfaces can have a different distance from the reference plane. The radiation surfaces are e.g. situated on a same side of the reference plane.

It is also feasible for at least two input coupling surfaces to have a different distance from the reference plane and additionally for at least two radiation surfaces to have a different distance from the reference plane.

A respective radiation source may be selected from a following group of radiation sources: light-emitting diode (LED), laser light source, laser activated remote phosphor (LARP) source, organic light-emitting diodes (OLED). For the illumination system, identical radiation sources can be provided or a combination of at least two different radiation sources can be provided.

The LED can be present in the form of at least one individually packaged LED or in the form of at least one LED chip having one or more light-emitting diodes. It is possible for a plurality of LED chips to be mounted on a common substrate ("sub-mount") and to form an LED or be attached individually or together for example on a printed circuit board (e.g. FR4, metal core PCB etc.) ("CoB"=Chip on Board). The at least one LED can be equipped with at least one dedicated and/or common optical unit for beam guidance, for example with at least one Fresnel lens or a collimator. Instead of or in addition to inorganic LEDs, for example based on AlInGaN or InGaN or AlInGaP, generally also organic LEDs may be used (OLEDs, e.g. polymer OLEDs). The LED chips can be directly emitting or have an upstream phosphor. Alternatively, the light-emitting component can be a laser diode or a laser diode arrangement. Also feasible is the provision of an OLED light-emitting layer or a plurality of OLED light-emitting layers or an OLED light-emitting region. The emission wavelengths of the light-emitting components can be in the ultraviolet, visible or infrared spectral range. The light-emitting components can additionally be provided with a dedicated converter. The LED chips may emit white light in the standardized ECE white field of the automobile industry, for example realized by way of a blue emitter and a yellow/green converter.

In a further configuration of various embodiments, the radiation sources can be arranged on a holding element, such as for example a printed circuit board or a substrate, as a result of which the radiation sources are easy to handle and are easily positionable relative to one another. The holding element can here have a, e.g. approximately, planar holding surface. For setting the distance, the corresponding radiation source can be arranged easily in terms of apparatus via a step at the holding surface. For setting the distance, the height of the corresponding step can be adapted. It is then feasible to provide a plurality of steps that have different heights. In other words, the radiation sources can be placed on the printed circuit board individually and/or in groups at different height levels due to steps having different heights. The step/s can have a cross section that is, e.g. approximately, transverse to the surface normal and/or to the main emission axis of the assigned radiation surfaces, which is/are selected from the following cross-sectional forms: angular, rectangular, n-angular, round, elliptical, free-form, wherein the step surfaces having polygonal or elliptical cross-sectional forms can be arranged differently with respect to their orientation or rotation. As a result, specifications relating to required installation space or a design can be implemented in a flexible manner. It is furthermore feasible for a step surface or step surfaces, on which the at least one radiation source or in each case at least one radiation source is provided, to have a perimeter shape or in each case one perimeter shape selected from the following perimeter shapes: angular, rectangular, n-angular, round, elliptical, free-form. The steps and/or the step surfaces may have a, e.g. approximately, identical orientation, whereby the radiation sources can be arranged thereon likewise with an identical orientation in a manner which is simple in terms of apparatus. It is alternatively feasible for a step or a step surface or part of the step or step surfaces or all steps or step surfaces to have a different orientation. Rather than providing the printed circuit board with the steps, or in addition to providing the printed circuit board with the steps, it is feasible to provide a plurality of different printed circuit boards which are arranged next to one another and/or are configured such that the desired distances are provided.

In order to permit flexible arrangement of the radiation sources, it is feasible for the steps or some of the steps or groups of steps to be arranged at a distance from one another. Provision may be made here for the steps or some of the steps or groups of steps to adjoin or be connected to one another. Provision may be made, for example, for individual steps or some of the steps or all steps or groups of steps to be configured in the form of an island in a manner which is simple in terms of apparatus. It is furthermore feasible for individual steps or some of the steps or all steps or groups of steps to be configured in the form of a half island in a manner which is simple in terms of apparatus. In other words, a step shape of the step and the orientation and placement thereof are variable, which may be advantageous as regards an adaptation with respect to a specified design.

In a further configuration of various embodiments, one or more radiation sources are arranged on a respective step.

In a further configuration of various embodiments, the distances can increase, in particular continuously or incrementally, from inside the illumination system to the outside. Provision may furthermore be made for the distances to become, e.g. continuously or incrementally, first greater and then smaller from the inside to the outside of the illumination system. The inside can here be in the region of the optical main axis of the illumination system. This may be provided when using the illumination system in the high beam for providing higher light intensities in the central region of a light image.

In a further configuration of various embodiments, at least one inner light guide or a plurality of inner light guides and at least one outer light guide or a plurality of outer light guides are provided, wherein a distance of the input coupling surfaces of the inner light guide or the inner light guides from the assigned radiation surface is less than the distance of the input coupling surface of the outer light guide or of the outer light guides from the assigned radiation surface. Consequently, higher light intensities or light fluxes can be provided for example in an inner or middle or center region of the illumination system than in the outer region.

In various embodiments, at least one inner step or a plurality of inner steps and at least one outer step or a plurality of outer steps can be provided, wherein a height of the inner step or steps is then greater than a height of the outer step or steps. Consequently it is possible in this way also to obtain a higher light intensity or a higher light flux in an inner or middle or central region of the illumination system. The height of a step may be all the lower the further toward the outside it is provided. Provision may also be made for the heights of the steps to decrease from the inside to the outside, e.g. continuously. It is also feasible for the height of the steps to first decrease and then increase from the inside to the outside.

In a further configuration of various embodiments, the light guides and/or the radiation sources and/or the steps can be arranged in a matrix or in a line. It is feasible, for example, to provide them in one or more lines. It is thus possible, for example, for a single-line or multi-line configuration to be provided. It is furthermore feasible, for example, for more lines to be provided on the inside than on the outside. The line-type or matrix-type configuration is utilizable e.g. in an ADB system.

The light guides and/or the radiation sources and/or the steps may be symmetrically arranged. The symmetric arrangement is here effected e.g. with respect to an optical main axis and/or with respect to a plane in which the optical main axis is situated and then extends transversely to the line or the lines.

In various embodiments, a greater distance and/or a shorter light guide and/or no step and/or a step having a low height is/are provided at the location or locations where there are greater manufacturing tolerances. In various embodiments, the inner light guide or the inner light guides can be longer than the outer light guide or outer light guides. Provision may furthermore be made here for a distance of the inner light guide or the inner light guides from the corresponding radiation source to be smaller than a distance of the outer light guide or the outer light guides from the corresponding radiation source. This solution may have the effect that tolerances or manufacturing tolerances for example in the outer region of the holding element or of the printed circuit board can then be greater than in the inner region, because more play is available in the outer region due to the shorter light guides or the shorter light guide. In other words, due to tolerance requirements, small distances are not ensured over the entire optical unit and/or printed circuit board, but are provided only where they are the most important, for example because here the greatest light intensity and/or a more precise compensation for a temperature-induced length change is/are required, such as for example in the middle or at the center. If then for example high manufacturing tolerances cannot be observed at the edge or on the outside, then the provision of shorter light guides is simply planned here, with the result that the light guides located here and the radiation sources do not touch, for example, even when the full manufacturing tolerance is used.

The light guides can have, for example, a lateral surface over which the radiation that is coupled into the light guides is guided, in particular by way of total internal reflection. Consequently, no separate cladding is required, for example. A cross-sectional area of the light guides can have a for example angular or round configuration. It is furthermore feasible for the lateral surface to be configured in the form of a truncated cone or a truncated pyramid or with a freely defined form.

For setting the distances via the light guides, the latter can have a different shape and/or length.

In a further configuration of various embodiments, the light guides can be parts of an optical unit which can connect the light guides to one another on the output side via a common connecting section. The optical unit can then have an exit surface, facing away from the light guides, for the light or radiation exiting the light guides. The light guides can be, for example, connected in one piece with a connecting section. It is furthermore feasible for the light guides to face away from the connecting section.

According to various embodiments, a headlamp having an illumination system in accordance with one or more of the preceding aspects is provided. The headlamp may be used for a vehicle. The optical unit can then be a primary optical unit, downstream of which a secondary optical unit is then arranged. With the illumination system, the headlamp can then have an ADB function, for example.

The vehicle can be an aircraft or a watercraft or a land vehicle. The land vehicle can be a motor vehicle or a rail vehicle or a bicycle. In various embodiments, the vehicle is a truck or a passenger car or a motorcycle. The vehicle can furthermore be configured as a non-autonomous or partially autonomous or autonomous vehicle.

The term "approximately" can mean, for example, that a deviation in the tolerances which are typical in the art or of up to 5% can be provided.

Figure 1:
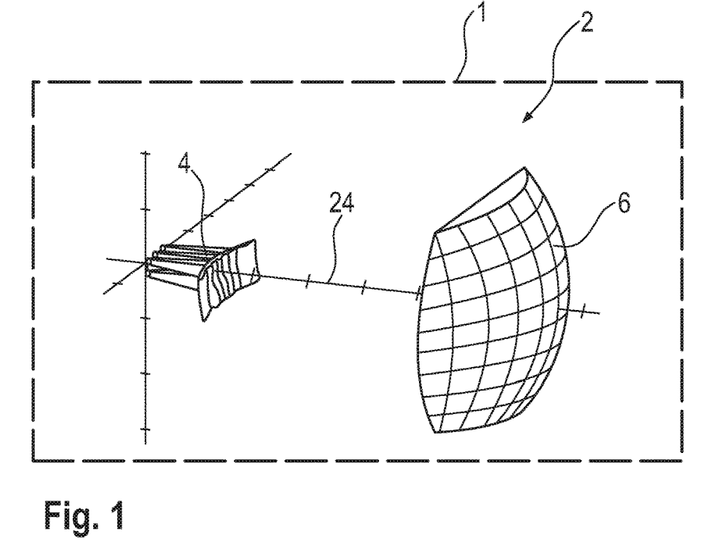
FIG. 1 shows a perspective illustration of an illumination system having two optical units in accordance with an embodiment.

FIG. 1 shows a headlamp for a vehicle 1 in simplified form with a dashed line. Said headlamp has an illumination system 2, which has an optical unit in the form of a primary optical unit 4 and a downstream optical unit in the form of a secondary optical unit 6. The primary optical unit 4 has a multiplicity of light guides, which are assigned in each case one radiation source in the form of a light-emitting diode (LED), wherein the LEDs are designated with a reference sign in FIG. 3 below.

Figure 2:
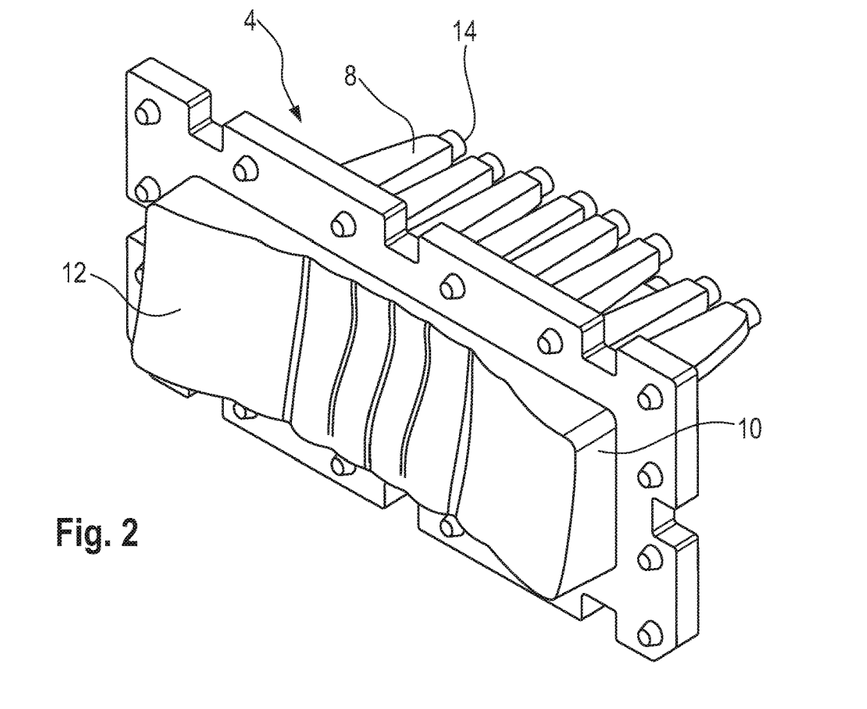
FIG. 2 shows a perspective illustration of an optical unit having a multiplicity of light guides.

FIG. 2 shows the primary optical unit 4 in enlarged fashion, although as compared to FIG. 1, it has a slightly modified form. The primary optical unit 4 has a multiplicity of light guides 8, with only one being provided with a reference numeral for the sake of simplicity. The light guides 8 are embodied in one piece with a connection section 10. The latter has an output coupling surface 12, which faces away from the light guides 8. A respective light guide 8 has an input coupling surface 14, which is assigned to a respective radiation source, see also FIG. 3, and faces away in each case from the output coupling surface 12.

Figure 3:
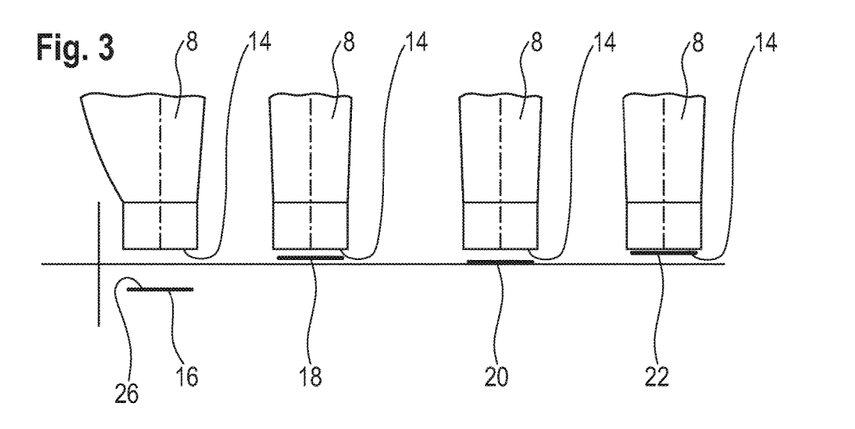
FIG. 3 shows a side view of a section of the illumination system from FIG. 1.

FIG. 3 shows some of the light guides 8 in a side view from the input side. Assigned to a respective light guide 8 is here a respective radiation source 16 to 22, which are in each case an LED. The planar input coupling surfaces 14 are arranged in one plane. Said plane extends transversely to the optical main axis 24 of the illumination system 2, see FIG. 1. The radiation sources 16 to 22 each have a radiation surface 26, although for the sake of simplicity, the radiation surface only for the radiation source 16 has a reference numeral in FIG. 3. The radiation surfaces 26 in accordance with the embodiment in FIG. 3 are embodied as planar surfaces. The radiation surfaces 26 of the radiation sources 16 to 22 each have a different distance from the respectively assigned input coupling surface 14 of the light guides 8. The light guide 8 on the right in FIG. 3 is here an inner light guide, which is provided at the center of the optical unit in accordance with FIG. 2. The light guide 8 which is on the left in FIG. 3 is the outermost light guide. It is clear that the radiation surface 26 of the radiation source 22 has the shortest distance from the corresponding input coupling surface 14 of the light guide 8. The neighboring radiation source 20 has a greater distance from the assigned input coupling surface 14. The radiation source 18, which in turn neighbors the radiation source 20, then has again a shorter distance from the assigned input coupling surface 14. The outermost radiation source 26 has the greatest distance from the assigned input coupling surface 14.

In accordance with FIG. 3, the radiation sources 16 to 22 have an identical radiation surface 26 or emission surface. The shape and size of the input coupling surfaces 14 of the light guides 8 is furthermore identical. It is here feasible for some of the radiation surfaces 26 or all of the radiation surfaces 26 to be different in terms of their shape and/or size. It is furthermore feasible for some of the input coupling surfaces 14 or all of the input coupling surfaces 14 to be different in terms of their shape and/or size.

Figure 4:
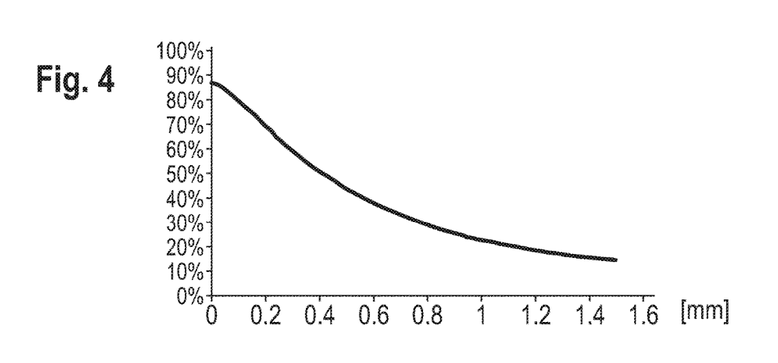
FIG. 4 shows a diagram of an input coupling efficiency in dependence on a distance of a radiation surface of a radiation source from an input coupling surface of a light guide.

FIG. 4 illustrates the connection between an efficiency of an input in % (ordinate) and a distance in mm (abscissa) between a radiation source and the assigned light guide. If a distance approaches 0, the greatest efficiency is obtained. As the distance increases, the efficiency of the input decreases, as a result of which less light is coupled into the corresponding light guide 8. An absolute maximum of the efficiency is determined by the materials used (refractive index, Fresnel reflections) and the geometries of the input coupling surfaces, radiation surfaces and light guides. FIG. 4 shows that at a distance of approximately 0.4 mm, only about 50% of the radiation is still coupled in. From about 0.7 mm, only about ⅓ of the radiation is coupled in. By setting the distances, it is thus possible to influence the efficiency of the light input, as a result of which a light distribution of light exiting the headlamp 1, see FIG. 1, can be influenced and fixed in a manner which is simple in terms of apparatus.

Figure 5:
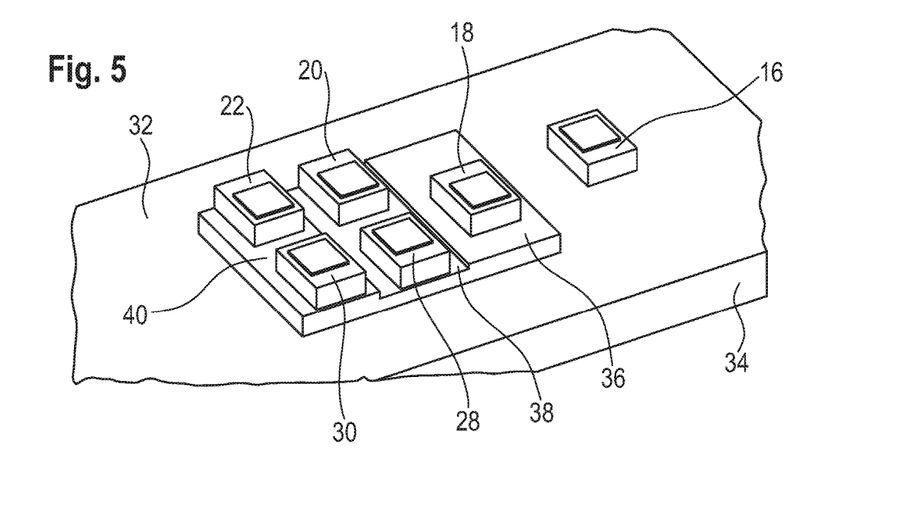
FIG. 5 shows a perspective illustration of a section of the illumination system from FIG. 1

FIG. 5 shows some of the radiation sources for the light guides 8 from FIG. 2. Here, the radiation sources 16 to 22 from FIG. 3 are shown, and also two further radiation sources 28 and 30, which cannot be seen in FIG. 3 because they are situated behind the radiation sources 20 and 22 as viewed in the direction of the drawing plane. The radiation sources 16 to 22, 28 and 30 are here arranged on a planar holding surface 32 of a printed circuit board 34. FIG. 5 shows only half the radiation sources for the optical unit 4 from FIG. 2. The radiation sources not illustrated in FIG. 5 are arranged so as to be symmetric with respect to the radiation sources 16 to 22, 28 and 30, wherein the symmetry is relative to a plane of symmetry which extends transversely to the holding surface 32 and in which the optical main axis 24 from FIG. 1 is situated, wherein the plane of symmetry would then be provided, in accordance with FIG. 5, to the left of the radiation sources 22 and 30. In order to reduce the distance of the radiation sources 18 to 22 and 28, 30 from the light guides 8, they are fixed to the holding surface 32 via steps 36, 38 and 40. The radiation sources 22 and 30 are here arranged on the innermost step. Provided adjacent thereto in an outward direction is the step 38, on which the radiation sources 20 and 28 are arranged. Arranged once again adjacent to step 38 is the step 36, on which the radiation source 18 is arranged. Consequently, two lines of radiation sources 20, 22 and 28 and 30 are provided in the inner region. Toward the outside, only one line of radiation sources 16, 18 is formed. The distance from the light guides 8 is then settable by way of the height of the steps 36 to 40, see also FIG. 3.

Figure 6A:
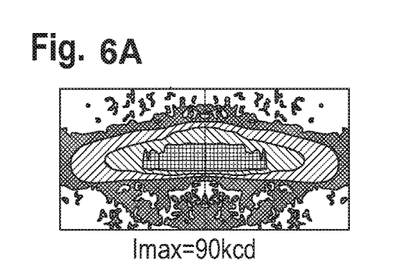
FIGS. 6A to 6D show different illustrations of light distributions of the illumination system.
Figure 6B:
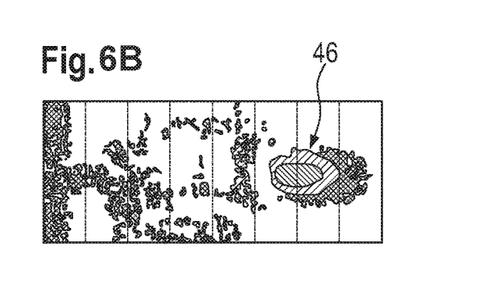
Figure 6C:
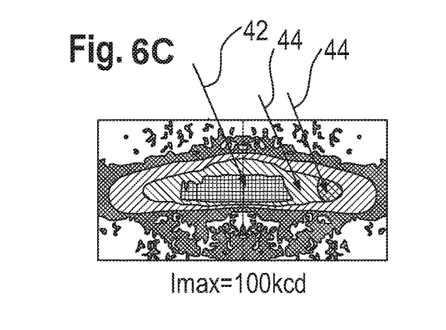
Figure 6D:
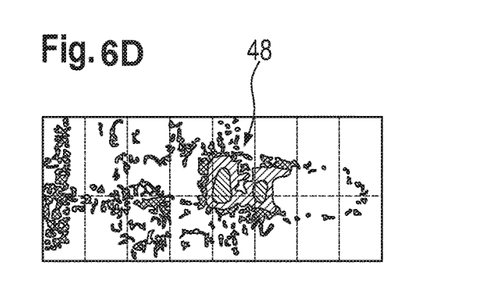

FIG. 6A illustrates a light distribution of light that exits the illumination system 1 from FIG. 1. Provision is made in accordance with FIG. 6A for the radiation sources to have an identical distance from the respectively assigned light guide. The light distribution is here symmetric. By contrast, FIG. 6C shows a light distribution in which some of the radiation sources have different distances from the assigned light guides. The radiation sources having the different distances correspond to those from FIG. 5, which have the reference signs 16 to 22, 28 and 30. The other radiation sources thus have an identical distance, in other words are provided without steps or different distances, so as to obtain a better comparison for the solution. In other words, FIG. 6C shows a combined light distribution. The left-hand half is of a "normal" design, that is to say without steps or different distances, while the right-hand half is configured as per the invention. Consequently, in accordance with FIG. 6C (in the right-hand part), a higher maximum light intensity as compared to FIG. 6A or compared to the left-hand part is provided. In accordance with FIG. 6C, the maximum light intensity is 100 kcd, while it is 90 kcd in FIG. 6A. The region marked by the arrow 42 has a higher light intensity because, in accordance with FIG. 5, the radiation sources 22 and 30 are arranged closer to their corresponding light guides 8. The regions marked by the arrows 44, on the other hand, are weaker in terms of light because the radiation sources 16, 20 and 28, see FIG. 5, are arranged at a greater distance from their assigned light guides 8. FIG. 6B and FIG. 6D show differences of the light distributions from FIG. 6A and FIG. 6C. For example, FIG. 6B shows a difference in which the light distribution from FIG. 6C is subtracted from the light distribution from FIG. 6A. It is clear that in the lateral region 46 a higher light intensity is present in the light image of FIG. 6A. In the illustration in FIG. 6D, the light distribution from FIG. 6A is subtracted from the light distribution in FIG. 6C, wherein it is clear on the basis of the region 48 that a higher light intensity is present in the inner regions or in the regions having the radiation sources 18, 22 and 30, see FIG. 5.

Figure 7:
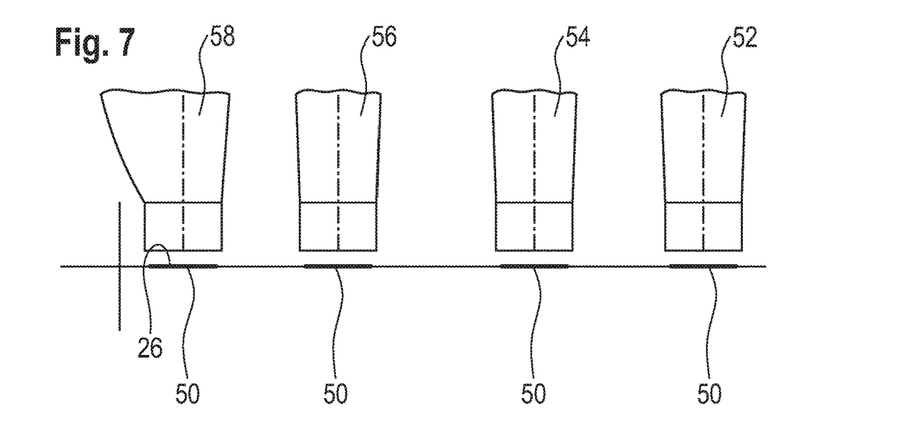
FIG. 7 shows a side view of a section of the illumination system in accordance with a further embodiment.

FIG. 7 shows an embodiment in which the radiation sources 50 are situated in a common plane, while light guides 52, 54, 56 and 58 are situated at different distances from the assigned radiation source 50. The inner light guide 54 (the one on the right in FIG. 7) here has the smallest distance from the radiation source 50. The distances then become ever greater toward the outside, as a result of which the outer light guide 58 has the greatest distance from the assigned radiation source 50. In this way, the distance between the light guides and the radiation sources can be provided in accordance with FIG. 3 by way of the different arrangement of the radiation sources or in accordance with FIG. 7 by way of the different arrangement or configuration of the light guides. It is likewise feasible to provide a combination here. The distances in FIG. 7 may be set via a length of the light guides 52 to 58.

Disclosed is an illumination system having a plurality of light guides, each having an input coupling surface. Assigned to a respective input coupling surface is here a radiation source. A distance of the light guides from the assigned radiation source differs in this case.

LIST OF REFERENCE SIGNS

| | |
|---|---|
| Headlamp | 1 |
| Illumination system | 2 |
| Primary optical unit | 4 |
| Secondary optical unit | 6 |
| Light guide | 8; 52 to 58 |
| Connecting section | 10 |
| Output coupling surface | 12 |
| Input coupling surface | 14 |
| Radiation source | 16 to 22, 28, 30; 50 |
| Main axis | 24 |
| Radiation surface | 26 |
| Holding surface | 32 |
| Printed circuit board | 34 |
| Step | 36, 38, 40 |
| Arrow | 42, 44 |
| Region | 46, 48 |

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An illumination system, comprising:
at least two light guides, wherein each of the at least two light guides comprises an input coupling surface and an output coupling surface, and at least two radiation sources; wherein a first radiation source of the at least two radiation sources comprises a first radiation surface that faces an input coupling surface of a first light guide of the at least two light guides and where a second radiation source of the at least two radiation sources comprises a second radiation surface that faces an input coupling surface of a second light guide of the at least two light guides; wherein a first distance between the input coupling surface of the first light guide of the at least two light guides and the radiation surface of the first radiation source of the at least two radiation sources is different from a second distance between the input coupling surface of the second light guide of the at least two light guides and the second radiation source of the at least two radiation sources.

2. The illumination system of claim 1,
wherein the input coupling surfaces of the at least two light guides face in an identical direction.

3. The illumination system of claim 1,
wherein the first radiation surface and the second radiation surface face in an identical direction.

4. The illumination system of claim 1,
wherein optical main axes of the input coupling surfaces of the at least two light guides are arranged to be parallel with respect to one another.

5. The illumination system of claim 1,
wherein main emission axes of the first radiation surface and the second radiation surface are arranged to be parallel with respect to one another.

6. The illumination system of claim 1, further comprising:
a reference plane;
wherein the input coupling surfaces of the at least two light guides have a different distance from the reference plane.

7. The illumination system of claim 1, further comprising:
a reference plane;
wherein the radiation surfaces of the at least two radiation sources have a different distance from the reference plane.

8. The illumination system of claim 1, further comprising:
a holding element;
wherein the at least two radiation sources are arranged on the holding element;
wherein the each radiation source of the at least two radiation sources is arranged at the holding element via at least one step for setting the distance.

9. The illumination system of claim 8,
wherein a height of each corresponding step is adapted for setting the distance.

10. The illumination system of claim 8,
wherein a first step of the at least one step is arranged at a distance from a second step of the at least one step.

11. The illumination system of claim 8,
wherein two or more steps of the at least one step are connected.

12. The illumination system of claim 1,
wherein the at least two light guides form part of an optical unit which connects the at least two light guides to one another on the output side by a common connecting section that has an exit surface, facing away from the at least two light guides, for the light exiting the light guides.

13. The illumination system of claim 12, wherein the distance increases from the inside to the outside of the optical unit.

14. A headlamp, comprising:
an illumination system, comprising:
at least two light guides, wherein each of the at least two light guides comprises an input coupling surface and an output coupling surface, and at least two radiation sources; wherein a first radiation source of the at least two radiation sources comprises a first radiation surface that faces an input coupling surface of a first light guide of the at least two light guides and where a second radiation source of the at least two radiation sources comprises a second radiation surface that faces an input coupling surface of a second light guide of the at least two light guides; wherein a first distance between the input coupling surface of the first light guide of the at least two light guides and the radiation surface of the first radiation source of the at least two radiation sources is different from a second distance between the input coupling surface of the second light guide of the at least two light guides and the second radiation source of the at least two radiation sources.

* * * * *